ISAAC SMITH.
Improvement in Lamp Chimney Cleaners.

No. 119,890.　　　　　　　　　　　　　Patented Oct. 10, 1871.

Witnesses.
Orlando L. Wieting.
E. C. Gilman.

Inventor.
Isaac Smith.
By Mills W. Leggett.
Attorney.

UNITED STATES PATENT OFFICE.

ISAAC SMITH, OF NEW YORK, N. Y.

IMPROVEMENT IN LAMP-CHIMNEY CLEANERS.

Specification forming part of Letters Patent No. 119,890, dated October 10, 1871.

*To all whom it may concern:*

Be it known that I, ISAAC SMITH, of the city, county, and State of New York, have invented a certain Improvement in Lamp-Chimney Cleaners; and I hereby declare the following to be a clear and exact description of the same, such as would enable others skilled in the art to make and use the same, reference being had to the accompanying drawing forming part of this specification.

Figure 1:
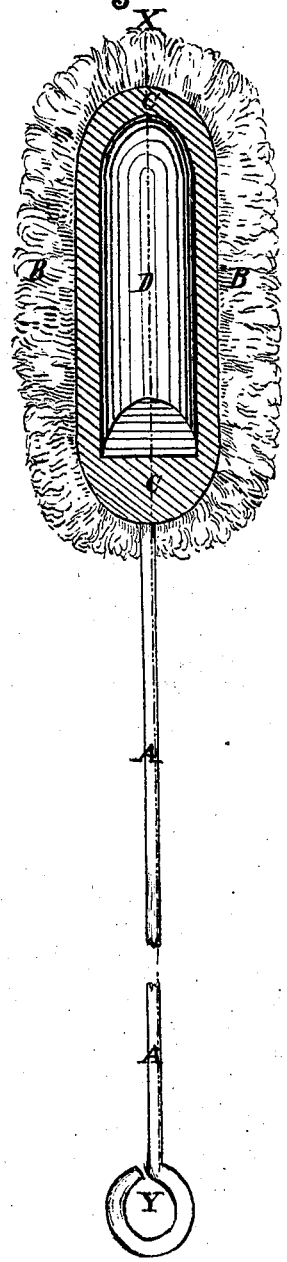
Figure 2:
Figure 3:

In the drawing, Figure 1 represents a plan of the cleaner with the lamb's-wool on the under side. B represents the lamb's-wool. C is the shellac plastic. D is the cavity, and A is the wire handle. Fig. 2 represents a plan of a piece of the lamb skin used in making the cleaner, with the notch F cut from one end. Fig. 3 is a section along X Y in Fig. 1, showing the wire handle bent at the point where it enters the plastic, and showing also the lamb-skin bent over at E before the plastic is applied.

My invention relates to an improved method of fastening the lamb-skin, employed in making the brush or cleaner, to the handle in such manner as to avoid the injurious effects of water upon the same, and to the useful and economical combination of the handle, the brush, and the body of the brush. My invention consists of taking a piece of lamb-skin with the wool on, of dimensions of three inches and one-half (3½) by one inch and three-fourths (1¾), (though these dimensions may be varied according to the size or style of the brush,) of oval form. I place this lamb-skin in a semi-cylindrical mold of cigar-shape. I cut a notch in the end of the piece so as to make it conform to the surface of the mold. I then make a plastic, of which the base is shellac, having previously permeated the body of the lamb-skin with varnish, rendering it impervious to moisture. I then turn up the skin, which is at the end where the handle enters, to the extent of about one-quarter of an inch, so that when the handle is placed in position and the plastic pressed in a portion of same will come below and a portion above the skin and adjacent to the wire handle, making a secure and neat fastening. The wire handle, from the point where it enters the plastic, is bent down and then forward again, so that when the plastic is pressed about it it will be secure, and not twist or otherwise work out of place. When the skin is in the mold, the end turned up, and the handle placed in position, I put the plastic into the mold. When the plastic, which is very hot and soft, comes into contact with the varnish it softens the latter, and the two unite so as, when cool, to form a strong adhesion between them, which will only give way under the influence of a strong heat. This adhesion is brought about under the pressure of several tons' weight, and the plastic is economized in the greatest amount possible by leaving a hollow in the upper side of same. This hollow is intended also to be used when convenient for carrying away debris, such as lamp-wick clippings, &c. The varnish referred to may be of any nature that will render the skin impervious to moisture and unite with the shellac plastic as above.

I disclaim the use of lamb-skin for lamp-chimney cleaners.

I propose to use lamb-skin prepared in this manner for hat-brushes, &c., when the bodies of same are made of this shellac plastic.

What I claim as new, and desire to secure by Letters Patent, is—

The lamp-chimney cleaner, made of lamb-skin, a body of shellac, and a wire handle, prepared and attached together in the manner substantially as set forth.

ISAAC SMITH.

Witnesses:
 ADOLPH PEARL,
 J. WILLIS WESTERVELT.